(12) United States Patent
Heinrich et al.

(10) Patent No.: US 7,194,648 B2
(45) Date of Patent: Mar. 20, 2007

(54) PROCESS FOR TIME SYNCHRONIZATION OF AT LEAST TWO CLOCKS IN A MICROPROCESSOR SYSTEM

(75) Inventors: Werner Heinrich, Haag (DE); Andreas Weitl, Reischach (DE)

(73) Assignee: EADS Deutschland GmbH, Ottobrunn (DE)

( * ) Notice: Subject to any disclaimer, the term of this patent is extended or adjusted under 35 U.S.C. 154(b) by 484 days.

(21) Appl. No.: 10/866,097

(22) Filed: Jun. 14, 2004

(65) Prior Publication Data

US 2005/0066211 A1     Mar. 24, 2005

(30) Foreign Application Priority Data

Jun. 13, 2003     (DE) ................ 103 27 116

(51) Int. Cl.
*G06F 1/12*     (2006.01)
(52) U.S. Cl. .............. 713/375; 713/400; 375/354
(58) Field of Classification Search ........... 713/375, 713/400, 401; 375/354, 355, 356
See application file for complete search history.

(56) References Cited

U.S. PATENT DOCUMENTS

| | | | |
|---|---|---|---|
| 5,070,517 A | | 12/1991 | Koechler et al. |
| 5,875,320 A | * | 2/1999 | Gu ................ 713/375 |
| 5,896,524 A | * | 4/1999 | Halstead et al. ........ 713/375 |
| 6,199,169 B1 | | 3/2001 | Voth |

| | | |
|---|---|---|
| 2003/0179780 A1 | 9/2003 | Walker et al. |

FOREIGN PATENT DOCUMENTS

WO     WO 02/080440     10/2002

OTHER PUBLICATIONS

Li-Shen Juhn et al., "Achieve High Acuracy of Network Time with Proper Parameters", Computer Communications, 1999, pp. 419-431, vol. 22, Elsevier Science B.V.

* cited by examiner

*Primary Examiner*—Rehana Perveen
*Assistant Examiner*—Paul Yanchus, III
(74) *Attorney, Agent, or Firm*—Crowell & Moring LLP

(57) ABSTRACT

A method for time synchronisation of at least two clocks contained in a multiprocessor system, wherein a first clock having a predetermined clock rate generates consecutive respective time-stamps indicating the time and at least one second clock which has an adjustable clock rate is synchronised with the first clock at certain time intervals. At predetermined time intervals the relative temporal position of flanks of the first clock and of the second clock representing the transition between two consecutive time-stamps is recorded. From the change in the relative temporal position of the transition flanks of the first clock and of the second clock a correction factor representing the time deviation between the first clock and the second clock is determined. Using the correction factor representing the time deviation between the first clock and the second clock the clock rate of the second clock is readjusted in the sense of a diminution of the time deviation between the first clock and the second clock. The recording, determination and readjustment are repeated.

12 Claims, 10 Drawing Sheets

PROBLEMS ASSOCIATED WITH READ ACCESS

PRINCIPLE OF THE TWO-STEP EDGE SEARCH

MAXIMUM READ ERRORS DURING THE TWO STEP EDGE SEARCH

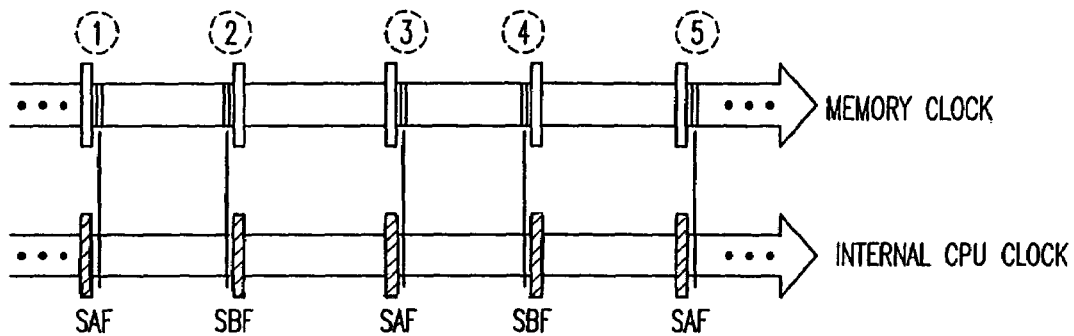
FIG.8 IDEAL INTERNAL CLOCK WITHOUT DRIFT
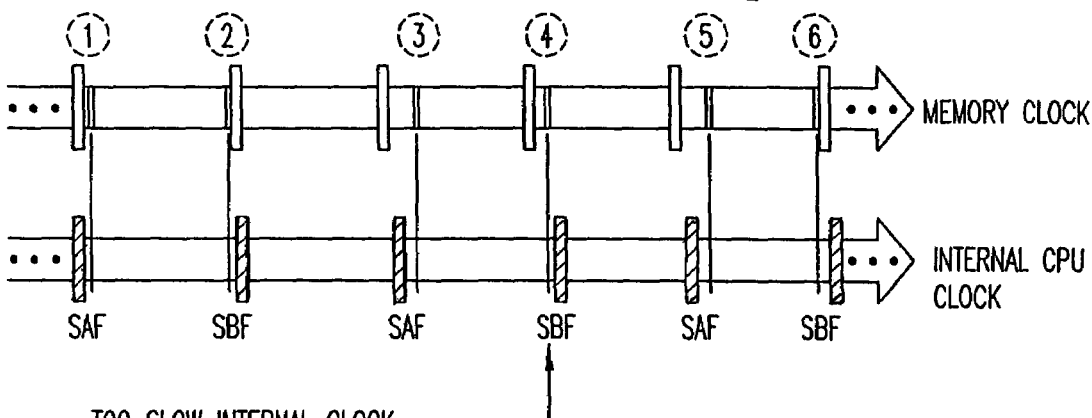
FIG.9 TOO SLOW INTERNAL CLOCK — DRIFT IS RECOGNIZED

EXAMPLE OF A CORRECTION WHEN THE CLOCK IS TOO FAST

EXAMPLE OF A CORRECTION WHEN THE CLOCK IS TOO SLOW

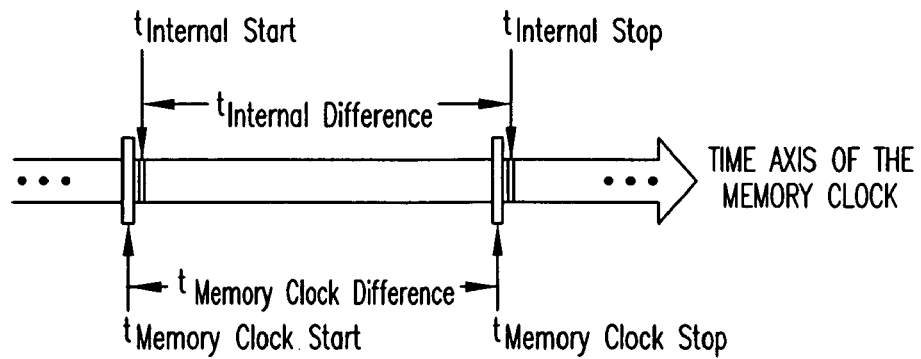
MEASUREMENTS FOR THE START CORRECTION FACTOR
FIG.12
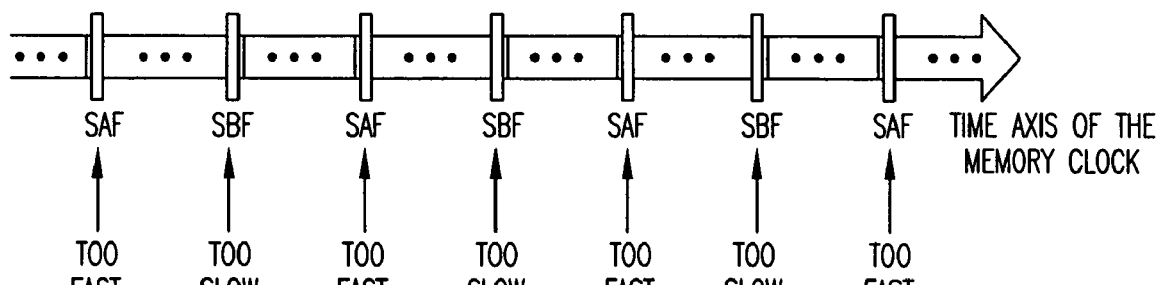
EXAGGERATED COURSE OF SYNCHRONIZATION
FIG.15

CALCULATION OF THE CORRECTION FACTOR WHEN THE CLOCK RUNS TOO SLOWLY

CALCULATION OF THE CORRECTION FACTOR WHEN THE CLOCK RUNS TOO FAST

CHANGE IN THE DIRECTION FACTOR AT CONSTANT DRIFT

CHANGE IN THE DIRECTION FACTOR AT CONSTANT DRIFT

PRINCIPLE RELATING TO THE DISTRIBUTION OF BUS ACCESS

TIME PERIODS FOR READING A TIME STAMP

TOTAL OVERVIEW OF THE SYNCHRONIZATION MODEL

PROCESS FOR TIME SYNCHRONIZATION OF AT LEAST TWO CLOCKS IN A MICROPROCESSOR SYSTEM

BACKGROUND AND SUMMARY OF THE INVENTION

This application claims the priority of German Application No. 103 27 116.3, filed Jun. 13, 2003, the disclosure of which is expressly incorporated by reference herein.

The invention relates to a method for time synchronisation of at least two clocks contained in a multiprocessor system.

In a multiprocessor system, such as is used, for example, for the purpose of processing large amounts of data and/or various tasks in real time, one difficulty consists in synchronising the clocks of the individual processors in such a way that they run in like manner, i.e. so that the temporal deviation thereof does not exceed a certain predefined tolerance value. A "clock" in this connection is to be understood to mean a timing-pulse generator or clock-pulse generator in the form of, for example, a "counter" or a "timer" which initially generates a relative—time-indication in the form of a time-stamp, which, however, can be converted to the current time in the style of an absolute-time clock. A "counter" is usually realised by a precise quartz-crystal oscillator which oscillates at a particular frequency that is more or less precise, depending on the quality and type of the quartz crystal. A counter register which is incremented by 1 after each period-length P or after a fraction thereof is usually connected to the quartz crystal. Also similar to the "counter" is the "timer", which, in contrast, exhibits an additional register in the form of a so-called holding register. After each period-length T of the quartz crystal or after a multiple thereof, the counter register is decremented. As soon as this counter register has been decremented to zero, an interrupt is generated and the counter register is set to the value in the holding register.

A problem is constituted, on the one hand, by a fundamental deviation of the oscillation of the quartz crystal, by the latter "going" too fast or too slowly, and, on the other hand, by a "drifting-away" as a function of temperature. The cycle deviation of a quartz crystal at constant temperature is represented in FIG. 2a); the drifting-away at first in the event of a change of temperature, for example when the processor is starting up, and then a constant cycle deviation at constant temperature, are represented in FIG. 2b).

The invention proceeds from a method for time synchronisation of at least two clocks contained in a multiprocessor system, wherein a first clock having a predetermined clock rate generates consecutive respective time-stamps indicating the time and at least one second clock which has an adjustable clock rate is synchronised with the first clock at certain time intervals.

The object of the invention is to create a method of this type in such a way that a bus by which the processors of the multiprocessor system are connected to one another is loaded as little as possible by the time synchronisation.

By virtue of the invention, a method is created for time synchronisation of at least two clocks contained in a multiprocessor system, wherein a first clock having a predetermined clock rate generates consecutive respective time-stamps indicating the time and at least one second clock which has an adjustable clock rate is synchronised with the first clock at certain time intervals. According to the invention there is provision that a) at predetermined time intervals the relative temporal position of flanks of the first clock and of the second clock representing the transition between two consecutive time-stamps is recorded, that b) from the change in the relative temporal position of the transition flanks of the first clock and of the second clock a correction factor representing the time deviation between the first clock and the second clock is determined, that c) by means of the correction factor representing the time deviation between the first clock and the second clock the clock rate of the second clock is readjusted, wherein the readjustment is of a diminution of the time deviation between the first clock and the second clock, and that d) steps a) to c) are repeated.

According to one aspect of the invention, the temporal position of the transition flanks of the first clock and/or of the second clock can be recorded by polling, by the time-stamp of the clock in question being read out at least twice in succession and by the time-stamps obtained thereby being compared with one another and by the read-out of the time-stamp being repeated until such time as the time-stamp last obtained differs from the previous time-stamp.

According to another aspect of the invention, the change in the temporal position of the transition flanks of the first clock and of the second clock can be recorded by a two-stage flank search, by the time-stamp of the clock in question being read out once before an assumed transition flank between two consecutive time-stamps and once after an assumed transition flank between two consecutive time-stamps and by the time-stamp obtained in each instance being compared with the time-stamp expected for the time of read-out and by this process being continued, wherein i) a concordance both of the time-stamp obtained in the case of read-out before the assumed transition flank with the expected time-stamp and of the time-stamp obtained in the case of read-out after the assumed transition flank with the expected time-stamp is appraised with respect to a correct position of the assumed transition flank, ii) a concordance of the time-stamp obtained in the case of read-out before the assumed transition flank with the expected time-stamp and a concordance of the time-stamp obtained in the case of read-out after the assumed transition flank, but with an earlier time-stamp than that expected, is appraised with respect to a belated position of the assumed transition flank or with respect to a time of read-out that was too early, and iii) a concordance of the time-stamp obtained in the case of read-out after the assumed transition flank with the expected time-stamp and a concordance of the time-stamp obtained in the case of read-out before the assumed transition flank, but with a later time-stamp than that expected, is appraised with respect to a premature position of the assumed transition flank or in the sense of a time of read-out that was too late.

The read-out of the time-stamps can be undertaken in each instance before and after the same assumed transition flank between the same two consecutive time-stamps.

However, the reading of the time-stamps is preferably undertaken in each instance before and after various assumed transition flanks between respective various two consecutive time-stamps, in particular alternately.

It is particularly advantageous to perform the reading of the time-stamps in each instance alternately before and after various assumed transition flanks, which follow one another at equal time intervals.

According to a particularly advantageous embodiment of the invention, there is provision that at the start of the synchronisation process the position of the transition flanks is recorded by polling, by reading out the time-stamp of the clock in question at least twice in succession, comparing the time-stamps thereby obtained with one another and repeating the read-out of the time-stamp until such time as the time-stamp last obtained differs from the previous time-stamp, and that the change in the temporal position is then recorded by a two-stage flank search, by reading out the time-stamp of the clock in question once before an assumed transition flank between two consecutive time-stamps and once after an assumed transition flank between two consecutive time-stamps, comparing the time-stamp obtained in each instance with the time-stamp expected for the time of read-out and continuing this process, wherein i) a concordance both of the time-stamp obtained in the case of read-out before the assumed transition flank with the expected time-stamp and of the time-stamp obtained in the case of read-out after the assumed transition flank with the expected time-stamp is appraised with respect to a correct position of the assumed transition flank, ii) a concordance of the time-stamp obtained in the case of read-out before the assumed transition flank with the expected time-stamp and a concordance of the time-stamp obtained in the case of read-out after the assumed transition flank, but with an earlier time-stamp than that expected, is appraised with respect to a belated position of the assumed transition flank or with respect to a time of read-out that was too early, and iii) a concordance of the time-stamp obtained in the case of read-out after the assumed transition flank with the expected time-stamp and a concordance of the time-stamp obtained in the case of read-out before the assumed transition flank, but with a later time-stamp than that expected, is appraised with respect to a premature position of the assumed transition flank or with respect to a time of read-out that was too late.

There is preferably provision that the correction factor representing the time deviation between the first clock and the second clock is determined by comparison of the temporal spacing between, in each instance, two transition flanks of the first and second clocks corresponding to one another.

According to another preferred embodiment of the method according to the invention, there is provision that the clock rate of the second clock is readjusted in the sense of a diminution of the time deviation between the first clock and the second clock (step c) when at least two consecutive read-out processes have resulted in a time deviation in the same direction with respect to either of a belated position of the assumed transition flanks, or to be more exact, with respect to a read-out that was too early, or with respect to a premature position of the assumed transition flanks, or to be more exact, with respect to a time of read-out that was too late.

In a preferred embodiment of the method according to the invention, the first clock is a central, cyclically accurate clock.

The at least one second clock is preferably an internal clock of a processor contained in the multiprocessor system.

The second, internal clock is preferably a virtual clock generated by software.

The multiprocessor system preferably includes several processors with several second clocks assigned to these processors, which are synchronised with the first clock or by means of the latter.

In this connection it is preferable that the several second clocks are each synchronised with the first clock at various consecutive times.

BRIEF DESCRIPTION OF THE DRAWINGS

Exemplary embodiments of the method according to the invention will be elucidated in the following on the basis of the drawing.

Shown are:

FIG. 8: a diagram illustrating a synchronisation wherein an internal clock of a processor is ideally synchronised with a central, cyclically accurate clock;

FIG. 9: a diagram illustrating a synchronisation wherein an internal clock of a processor is running too slowly in relation to a central, cyclically accurate clock;

FIG. 10: a diagram illustrating a synchronisation wherein an internal clock of a processor is running too fast in relation to a central, cyclically accurate clock;

FIG. 12: a diagram illustrating the implementation of a starting correction at the beginning of the implementation of the synchronisation method according to the invention, according to an exemplary embodiment of the invention;

FIG. 15: a diagram illustrating the problem of "seesawing" such as can arise in the case of a too direct change of the correction factor;

DETAILED DESCRIPTION

Figure 1:
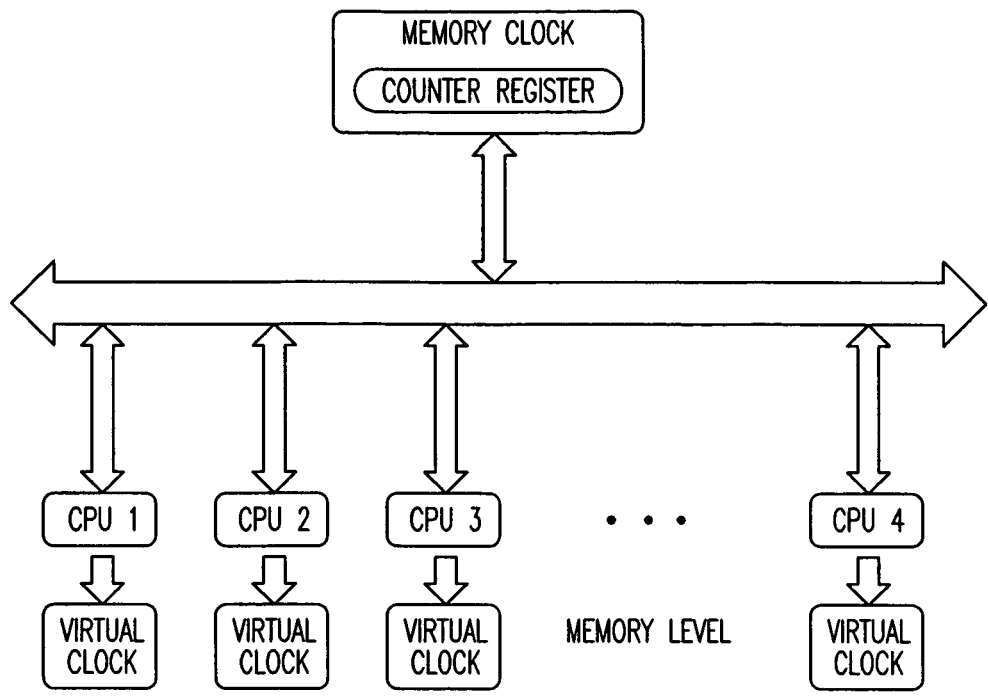
FIG. 1: a block diagram of a multiprocessor system wherein several processors are synchronised by means of a central clock.

FIG. 1 shows, in a block diagram, a multiprocessor system wherein several processors CPU 1 to CPU 16 are connected to one another via a bus connection in the form of a VME bus. With a view to synchronisation of this multiprocessor system, a first clock is provided which is designated as the mem clock. The latter can compromise an oscillating quartz crystal to which there is coupled a counter register which is incremented by 1 after each period-length T of the quartz crystal.

Each of the processors CPU 1 to CPU 16 is provided with an internal, virtual clock which is one of several second clocks in the sense of the invention that are to be synchronised with the first clock. These virtual clocks are realised by software, not by hardware. In the case of the exemplary embodiment that has been described, the objective is to maintain a desired maximal deviation of each of the second, virtual clocks from the first clock, the mem clock. This deviation may, for example, be specified to less than ±5 μs. This means that two distinct processors of the processors CPU 1 to CPU 16 must not deviate from one another by more than 10 μs.

Figure 2A:
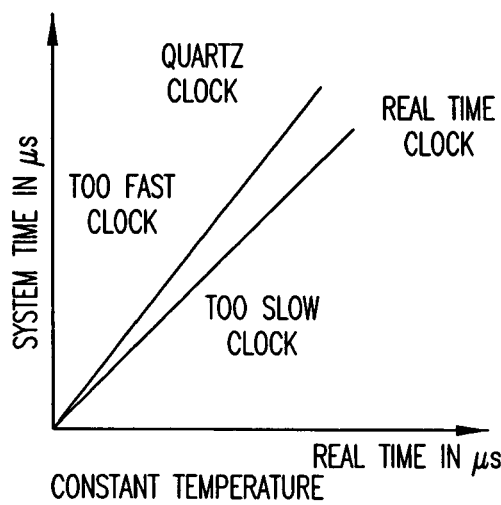
FIGS. 2a) and b): diagrams illustrating the drifting-away of the time measured by means of a quartz-crystal oscillator.
Figure 2B:
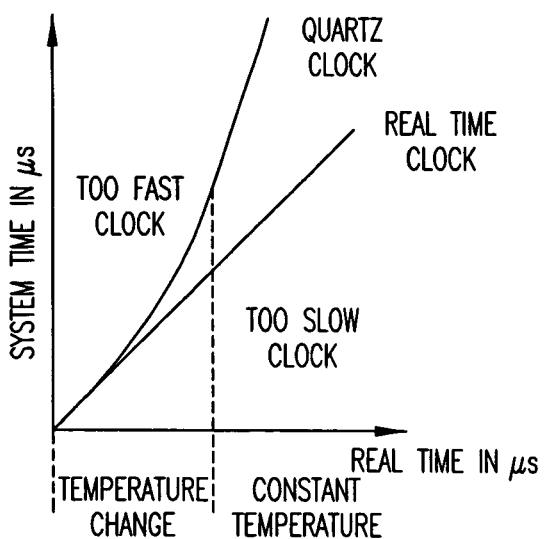

Without special measures for synchronisation of the first and second clocks, a "drifting-away" would arise, as already described in the introduction with reference to FIGS. 2a) and b).

Figure 3:
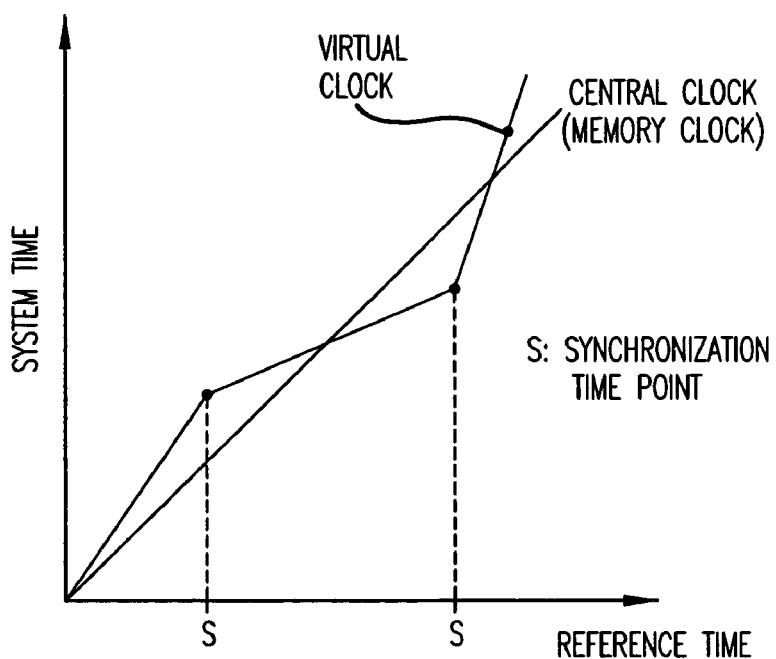
FIG. 3: a diagram illustrating a continuous synchronisation of a virtual clock in relation to a central, cyclically accurate clock.

With a view to synchronisation of the second, virtual clocks with the first clock, there are essentially two possibilities for adapting the cycle response of each second clock to the first clock by correction. The first option, represented in FIG. 3, is to make the second clock track the first clock continuously—that is to say, to correct the cycle speed of the second clock at appropriate synchronisation-times S in such a way that it oscillates about the cycle of the first clock. The virtual clock consequently runs on continuously; it is only adjusted to be faster or slower in the given case in order to make it track the first clock.

Figure 4:
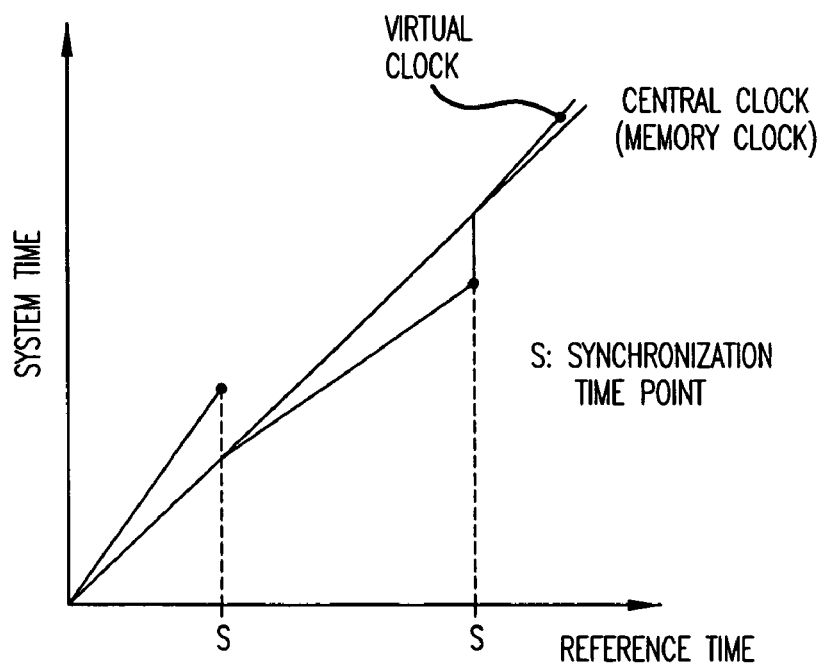
FIG. 4: a diagram illustrating a discontinuous synchronisation of a virtual clock in relation to a central, cyclically accurate clock.

In the case of the discontinuous synchronisation represented in FIG. 4, at appropriate synchronisation times S the second, virtual clock is reset to the value of the first, central clock and is restarted from there. The virtual clock accordingly "jumps" to another time and, depending upon whether the virtual clock was too fast or too slow, a gap arises in the time line (in order to make up for the "lost" time), or a period of time is repeated (in order to overwrite the "excess" time).

A continuous time response, such as is represented in FIG. 3, is mostly to be preferred; however, if the jumps in a system with discontinuous time response according to FIG. 4 are small enough, solutions with a discontinuous time response are also practicable.

Figure 5:
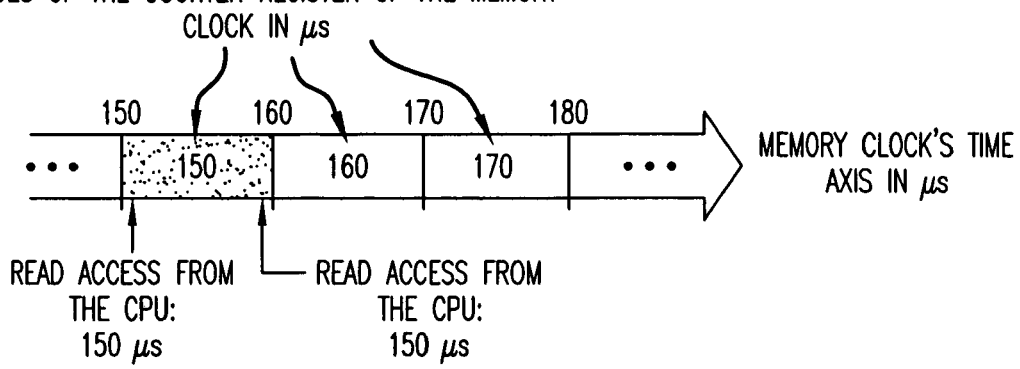
FIG. 5: a diagram illustrating the problems of read access in the course of synchronisation of two clocks.

One difficulty lies in the resolution of the first clock, the mem clock. If this resolution amounts, for example, to 10 μs, i.e. the counter register is incremented every 10 μs, then in the case of instantaneous read-out of the time-stamp of the mem clock this may signify an error of up to 10 μs, as shown in FIG. 5. For the time-stamp 150 μs, in the case of reading shortly after the last flank the value 150 μs may be output, for example; the real value might be approximately 151 μs. In the case of a different read access shortly before the next flank, once again a value of 150 μs would be output; the real value, however, might be 159 μs. This corresponds to an absolute error of 9 μs, which is too much for a meaningful synchronisation. The flank is understood to be the threshold between two time-stamps—thus, for example, between the time-stamps 140 μs and 150 μs, or between the time-stamps 150 μs and 160 μs. Accordingly, it is not so easily possible to retrieve the time-stamp value of the mem clock without thereby ruling out a relatively large read error.

One option is to seek the flank by polling, i.e. the respective processor CPU 1 . . . 16 reads the time-stamp of the mem clock at least twice in succession and compares the two time-stamps. If these are the same, the CPU reads another time-stamp from the mem clock. This is repeated until such time as the time-stamp last read differs from the previous one. If this is the case, the flank of the mem clock has been found. This principle is really easy to implement, but it has the disadvantage of considerable loading of the bus.

A better option, associated with a lower loading of the bus, consists in a procedure which is to be designated here as a "two-stage flank search". The idea in this case is to find, by means of only two different read operations as close as possible to the assumed flank of the mem clock, the flank thereof, and as a result to establish the drift rate of the internal clock of the respective CPU and to synchronise this drift rate with respect to the speed of the mem clock.

Figure 6:
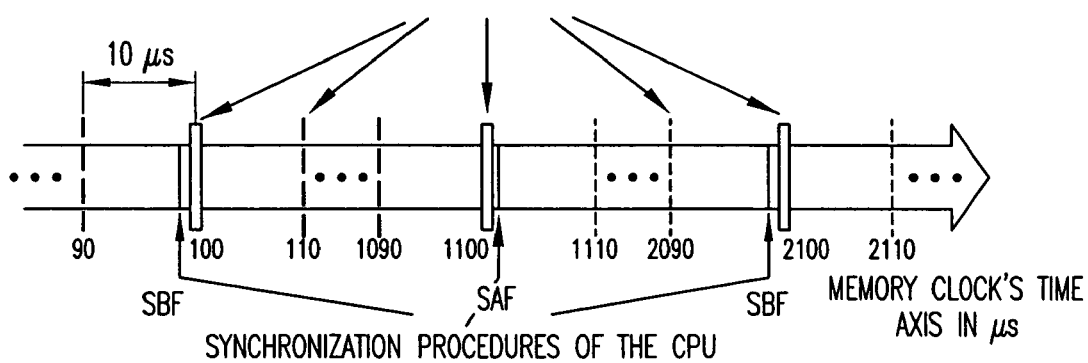
FIG. 6: a diagram illustrating a so-called two-stage flank search in the course of implementation of the method according to the invention.

Flanks between respective time-stamps are represented by the thick and thin long bars in FIG. 6. Here, by way of example, the flanks are to be recorded at 100 μs, 1100 μs and 2100 μs—that is to say, every 1000 μs in each given case. At 100 μs a reading is undertaken shortly before the expected flank; it is designated as SBF (SyncBeforeFlank). At 1100 μs, reading takes place shortly after the expected flank, this being designated as SAF (SyncAfterFlank). At 2100 μs, SBF reading is undertaken again. These two read processes or synchronisation processes are carried out alternately. The spacing between two synchronisation processes, i.e. the synchronisation interval tsyncInterval, is constant and should be as large as possible, in order to bring about a low loading of the bus. For reasons of clarity of layout, a synchronisation interval tsyncInterval=1 ms has been used in the diagram; in reality, however, a larger interval would be used. For the SBF read-out at 100 μs, the time-stamp 90 μs is expected. If this is actually read out, a read operation before the flank has actually taken place. In the case of the 1100 μs flank, for the SAF read-out a time-stamp 1100 μs is expected. If this is actually read out, a read-out after the flank has actually taken place. For the 2100 μs flank, once again for an SBF read-out the time-stamp 2090 μs is expected. If this is actually read out, the read-out has actually taken place before the flank.

However, if at 100 μs the 100 μs time-stamp were to be read already instead of the 90 μs time-stamp, then the 100 μs flank of the mem clock would be too early, which is tantamount to saying that the internal clock of the CPU has read too late—that is to say, it is running too slowly. The same applies, mutatis mutandis, to the SBF read-out at the 1100 μs flank. If, however, in the case of the SAF read-out at the 1100 μs flank only the 1090 μs flank is read instead of the expected 1100 μs time-stamp, then the 1100 μs flank of the mem clock would be too slow, which is tantamount to saying that the internal clock of the CPU has, in contrast, been running too fast.

Figure 7:
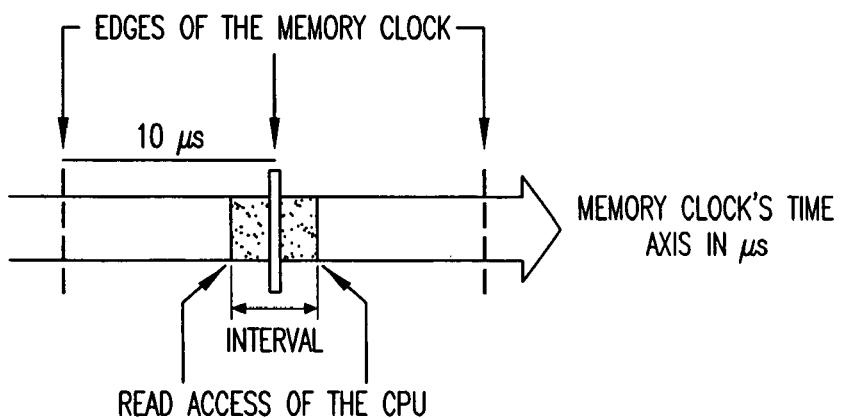
FIG. 7: a diagram illustrating the maximal read error in the case of a two-stage flank search.

This two-stage flank search is represented once again in FIG. 7 in such a way that the two read processes or synchronisation processes before the flank SBF and after the flank SAF for one and the same flank are combined into one process. The interval between SBF and SAF corresponds simultaneously to the maximal read error.

In order that the two-stage flank search can be carried out successfully in this way, it is advantageous if at the beginning a flank is found by polling in the manner described in the introduction and then the two-stage flank search is started.

FIG. 8 shows the synchronisation of an internal CPU clock that is running in a manner ideally synchronised with the mem clock. The synchronisations—SAF shortly after the assumed flank, and SBF shortly before the assumed flank—each lie within the correct time-stamp; accordingly, no correction has to be carried out.

In FIG. 9 a case is shown where the internal CPU clock is running too slowly in comparison with the mem clock. At 1, 2 and 3 the synchronisations SAF, SBF and SAF still lie within the valid, expected time-stamp; the cycle deviation is not yet detected. At 4, however, the read-out process SBF supplies the time-stamp of the mem clock, which already lies after the flank; however, the time-stamp is expected before the flank. Here the drift is detected; the flank in the case of the mem clock has already taken place; the internal CPU clock was accordingly too slow. Now if the internal CPU clock is corrected, at 6 an SBF read-out actually supplies the expected value before the flank again. At 5, in the case of the SAF read-out the value after the flank is supplied anyway.

In the case shown in FIG. 10 the internal CPU clock is running too fast in comparison with the mem clock. Whereas at 1 and 2 the SAF read-out after the flank and the SBF read-out before the flank supply the respectively expected correct value for the time-stamp, at 3 in the case of the SAF read-out the value of the time-stamp after the flank is expected; but the value of the time-stamp before the flank is actually supplied. This means that the flank at 3 is situated later than expected or, to be more exact, that the internal CPU clock has been running too fast. With diminution of the clock rate, at 5 the correct value of the time-stamp after the flank is then supplied again, as expected for the SAF read-out. At 4, for the SBF read-out before the flank the correct time-stamp is supplied anyway.

Figure 11A:
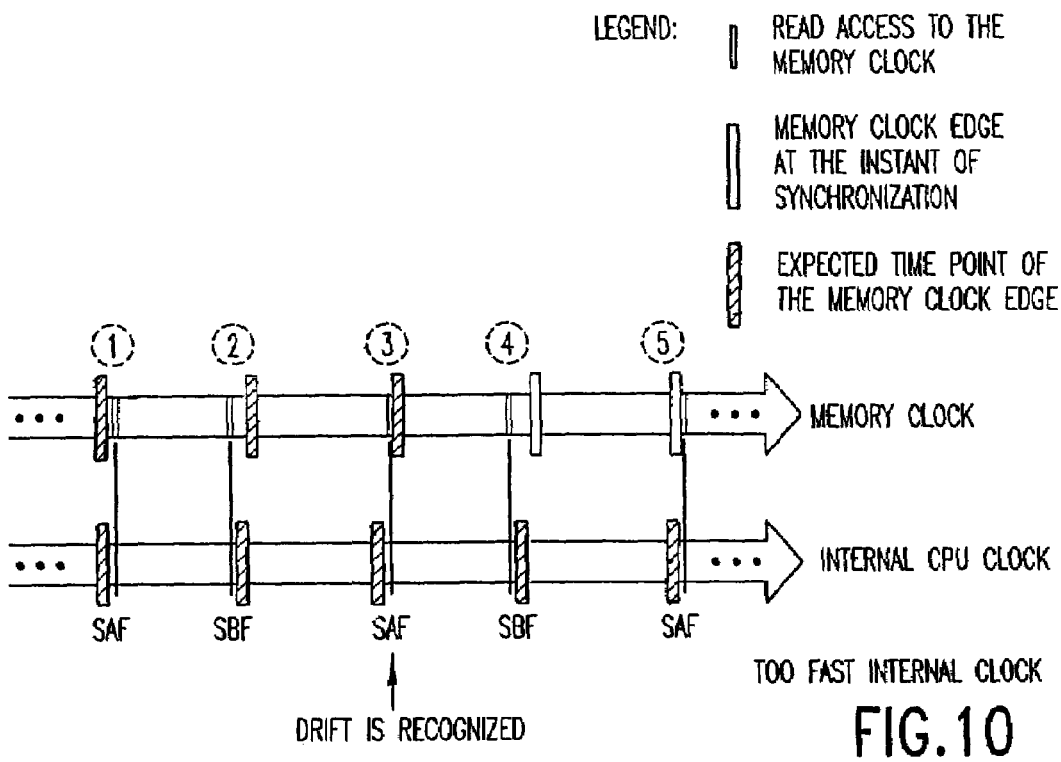
FIGS. 11a) and b): a diagram illustrating the creation of a correction factor in the case of, respectively, an internal clock of a processor running too fast and an internal clock of a processor running too slowly.

FIGS. 11a) and b) show examples of the correction factor for a clock that is too fast and for a clock that is too slow, respectively.

In FIG. 11a) the internal clock is running too fast; for the actual time interval tDistance=1 second of the mem clock, the internal clock requires on its time axis a corrected interval tCorrDistance=1.00000655 s.

Figure 11B:
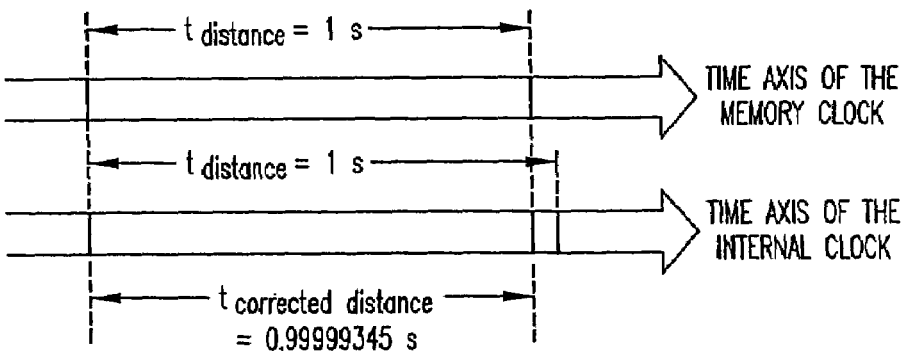

In FIG. 11b) the internal clock is running too slowly; for the actual time interval tDistance=1 second, the internal clock requires on its time axis merely a corrected time interval tCorrDistance=0.99999345 s.

On the basis of the synchronisation processes it is now possible for a correction factor to be ascertained in the following way. To begin with, a flank of the mem clock is determined, a fixed period of time is waited by polling, and the flank of the mem clock is again ascertained by means of polling. In the process the time of the internal clock for this period of time is measured. Similarly, the time of the mem clock for this period of time is measured. From this it is possible for a first correction factor to be calculated:

$$cF = tinternalDifference/tMemClockDifference - 1 \quad (1)$$

cf. FIG. 12.

With this starting correction factor the synchronisation can begin. If an incorrect deviation is detected during the synchronisation, the correction factor has to be adapted.

Figure 13:
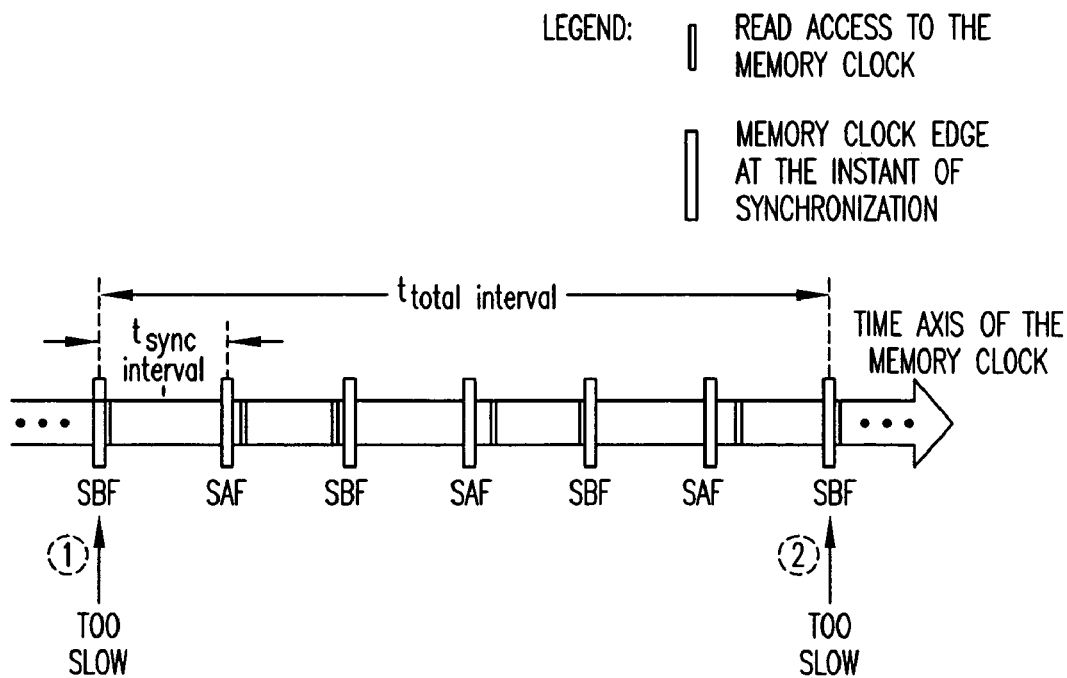
FIG. 13: a diagram illustrating the determination of a correction factor in the case of an internal clock of a processor running too slowly.

FIG. 13 shows the correction-factor calculation for an internal clock running too slowly, on the time axis of the mem clock. The intervals tsyncInterval between the synchronisation processes SBF, SAF are intentionally chosen to be very short, in order to make the principle of the correction-factor calculation evident; normally these intervals are further apart. At 1, for an SBF read-out the value of the time-stamp shortly after the flank of the mem clock was read; the internal clock was accordingly too slow and had to be corrected. At 2, for an SBF read-out the time-stamp was again read shortly after the flank of the mem clock, instead of the expected time-stamp before the flank; the internal clock is still too slow and has to be corrected once again. Between the two detected incorrect deviations of the internal clock from the mem clock there lie five synchronisation processes or, to be more exact, a time interval of ttotInterval=6·tsyncInterval. Furthermore, the previous correction factor cF is known. The new correction factor can be calculated as:

$$cF = cF - tCorrTime/ttotInterval \quad (2)$$

where $$tCorrTime = tmaxFlankInterval/2 \quad (3)$$

with the maximal read error tmaxFlankInterval shown in FIG. 7. The new error has to be subtracted, because the internal clock is too slow. This formula consequently applies only to the SBF read-out.

If the internal clock is too fast, this being detected during the SAF read-out, the correction factor has to be changed; the following then holds:

$$cF = cF + tCorrTime/ttotInterval \quad (4)$$

Figure 14:
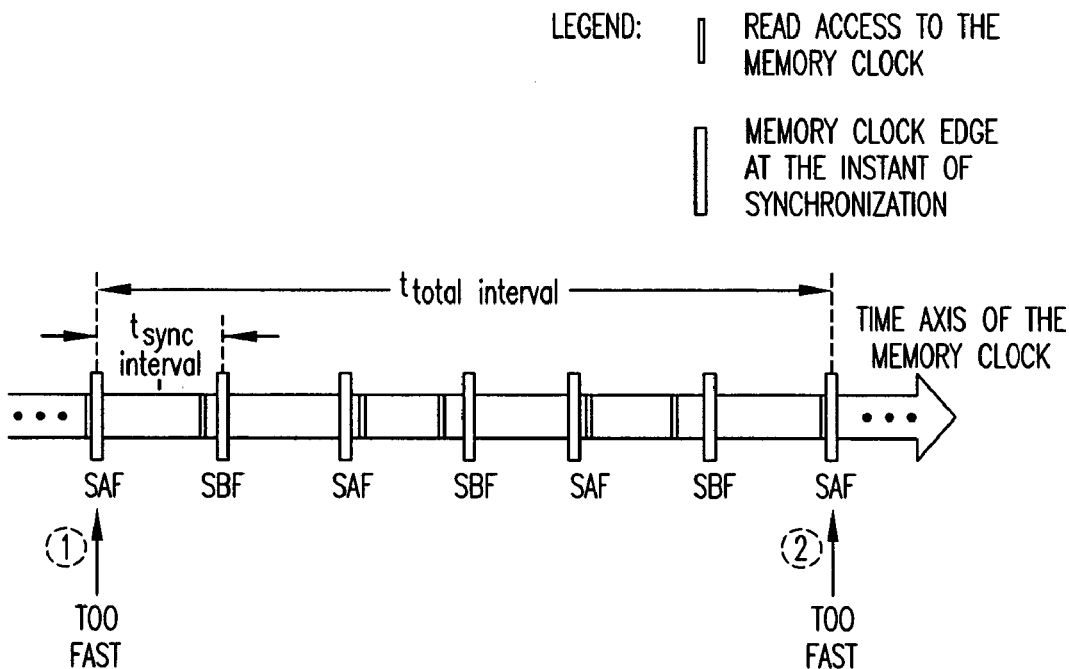
FIG. 14: a diagram illustrating the determination of a correction factor in the case of an internal clock of a processor running too fast.

The correction of the internal clock that is too fast is shown in FIG. 14.

If the correction factor were to be changed immediately upon detection of a cycle of the internal clock that is too fast or too slow compared with the mem clock, this could result in "seesawing" in such a way that with each synchronisation process SAF in which, instead of the time-stamp expected after the flank, the time-stamp situated before the flank is read out, tantamount to a cycle of the internal clock that is too fast, the latter is slowed down to such an extent that in the course of the SBF read-out following thereupon the value of the time-stamp following the flank is already read out instead of the expected time-stamp before the flank, whereupon the internal clock is again speeded up, resulting again in a cycle that is too fast, and so on and so forth. Such an exaggerated synchronisation sequence is shown in FIG. 15.

Figure 16:
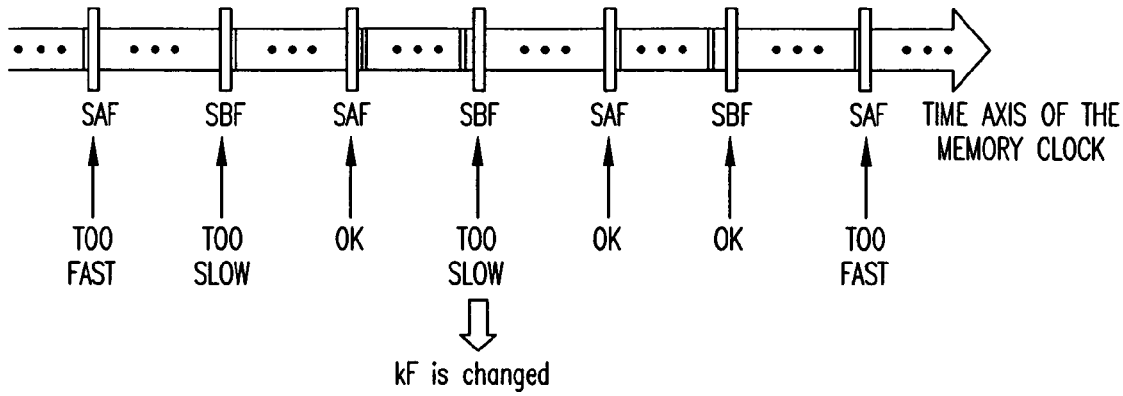
FIGS. 16 and 17: diagrams illustrating the change of the correction factor when an internal clock of a processor is running too slowly and too fast, respectively, according to an exemplary embodiment of the method according to the invention.
Figure 17:
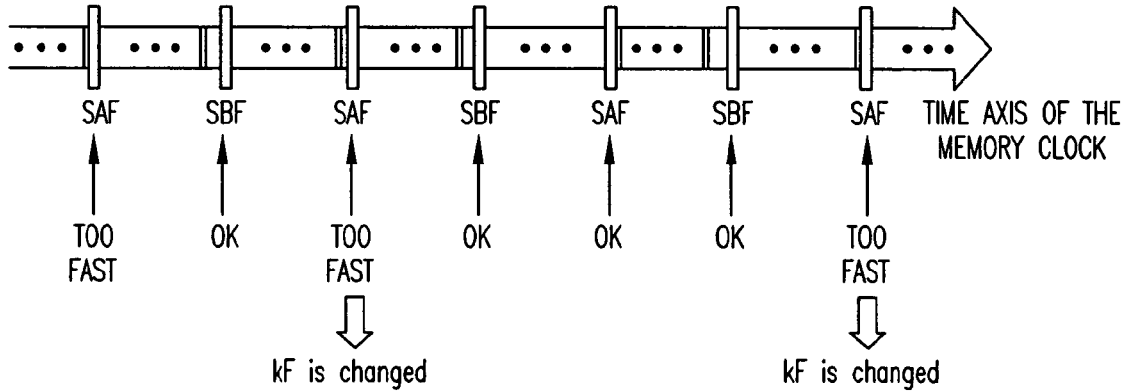

In order to prevent this, a change of the correction factor cF is undertaken only when a constant drift is detected in such a way that a first recording of a cycle deviation in a particular direction is followed by a second recording of a cycle deviation in the same direction, as has been represented in FIG. 16 for a constant drift of a clock running too slowly, and in FIG. 17 for a constant drift of a clock running too fast.

Figure 18:
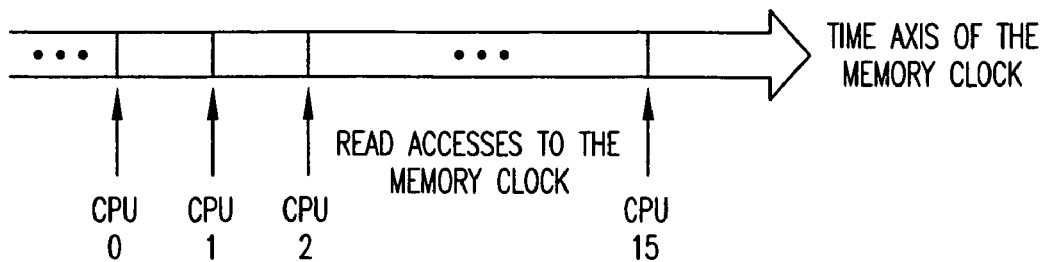
FIG. 18: a diagram illustrating a distribution of accesses to a common bus of the multiprocessor system.

FIG. 18 shows the principle of the distribution of the bus accesses of several processors CPU 0 to CPU 15 contained in the multiprocessor system with the objective of avoiding a collision. In the initialisation phase at the beginning of the synchronisation process each CPU retrieves for itself a time-stamp of the mem clock by way of reference value, with the aid of which the starting-time of the synchronisation can be calculated. To do this, each CPU must have a unique identification, in order to be able to make available a different starting-time for each CPU. Each further synchronisation process or, to be more exact, access to the mem clock may then take place only after multiples of a previously defined minimum interval. By this means, it is ensured that the CPUs do not block one another in the course of read access to the mem clock.

Figure 19:
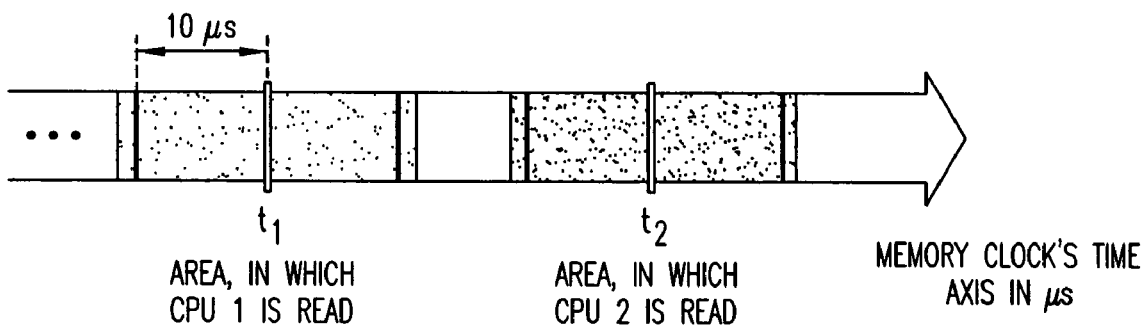
FIG. 19: a diagram illustrating differing time-ranges during which various processors have access to the common bus.

Represented in FIG. 19 are particular time-ranges separated by a sufficient safety margin, in which the individual CPUs, here CPU 1 and CPU 2, can read the time-stamp of the mem clock, represented on the time axis of the mem clock.

Figure 20:
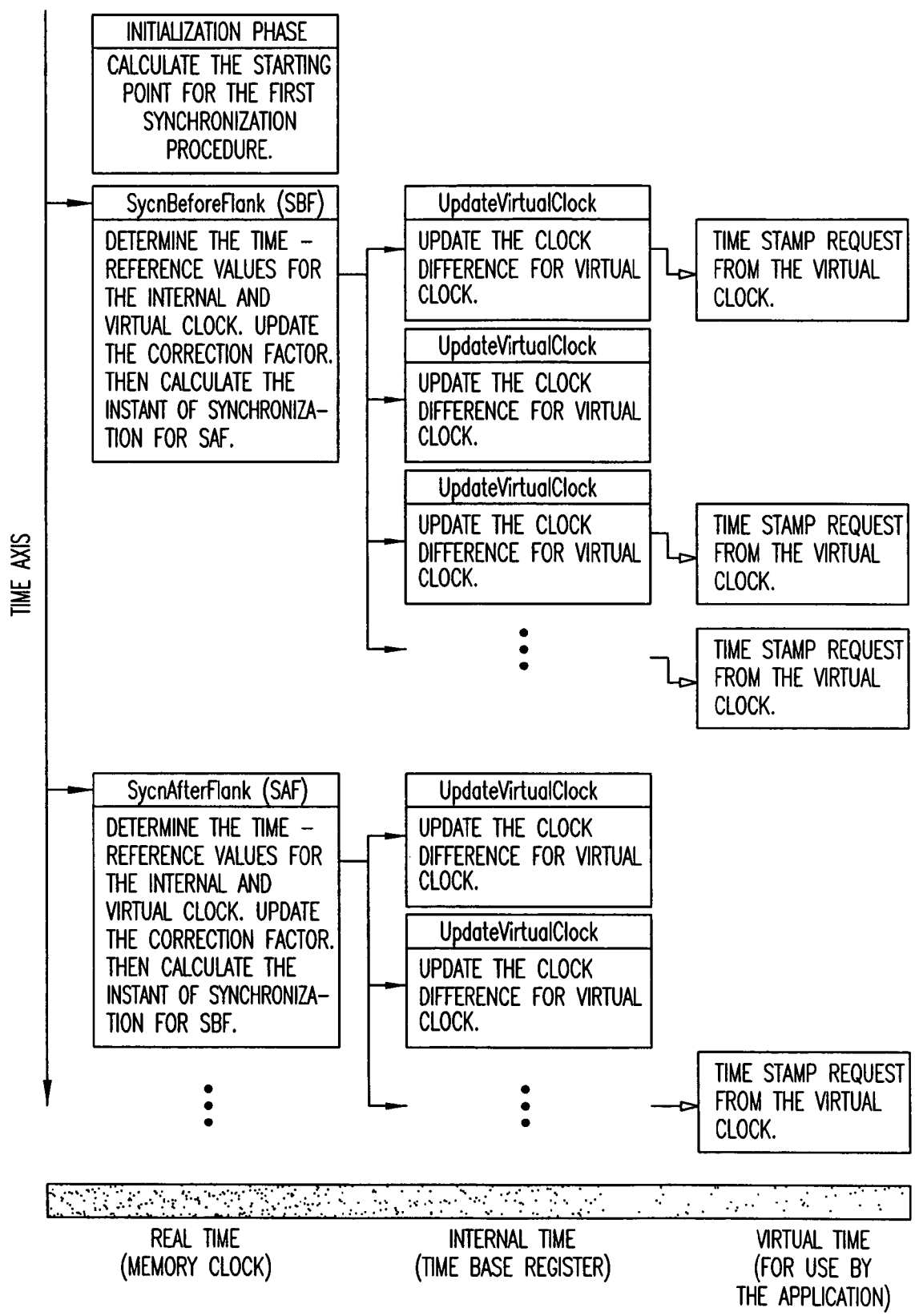
FIG. 20: a diagram which represents an overall view of a synchronisation method according to an exemplary embodiment of the invention.

FIG. 20 shows, in an overall view, a synchronisation model according to an exemplary embodiment of the invention wherein the "internal time" of several processors contained in a multiprocessor system are synchronised with respect to a "real time" supplied by a mem clock. The individual processors then supply, for use by their respective application, a "virtual time" which deviates from the "real time" by at most a predetermined time tolerance. Here the mem clock is employed in purely passive manner as a slave.

In the initialisation phase the bus read accesses of the various CPUs to the mem clock have to be distributed in such a way that they do not interfere with one another or, to be more exact, so that delays in the course of access to the mem clock are ruled out. To do this, during the initialisation a first valid mem-clock access time and the starting-time for the first synchronisation process are calculated for each CPU, as already explained previously.

With a view to synchronisation, a two-stage flank search is employed, i.e. there exist two different synchronisation processes, namely a synchronisation shortly before the next flank SBF and a synchronisation shortly after the last flank SAF. These are started alternately with a certain synchronisation interval tsyncInterval.

Finally, the virtual clock is corrected in time-controlled and cyclic manner, i.e. after a certain update interval the current clock difference between the internal clock and the virtual clock is determined. This process is called UpdateVirtualClock (UVC).

There consequently exist two "synchronisation algorithms", namely "SyncBeforeFlank" and "SyncAfterFlank" for calculating and updating the correction factor from the "real time" of the mem clock and from the internal time of the time-base register of each CPU, and "UpdateVirtualClock" for calculating and updating the clock-difference of the internal clock and of the virtual clock from the reference time values thereof, from the current correction factor cF and from a current internal time of the time-base register.

In the embodiment described above, the central, cyclically accurate mem clock was regarded as the first clock in the sense of the invention, the flanks of which were found by selection processes SAF shortly after the flank and SBF shortly before the flank, based on the time base of the respective internal CPU clock as the second clock. In other words, the selection processes SAF and SBF, which have the objective of obtaining the assumed flanks of the mem clock, are "triggered" by the flanks of the respective internal CPU clock.

With appropriate modification of the synchronisation algorithm, the two-stage flank search may, however, also be made in the other direction, namely so that the selection processes SAF and SBF are "triggered" by the mem clock, in order to find the assumed flanks of the respective internal CPU clock. To do this, in FIGS. 8 to 17 "mem clock" and "internal CPU clock" would merely have to be interchanged, and corresponding changes would have to be made in equations (1) to (4).

While the invention has been described in connection with various embodiments, it will be understood that the invention is capable of further modifications. This application is intended to cover any variations, uses or adaptation of the invention following, in general, the principles of the invention, and including such departures from the present disclosure as within the known and customary practice within the art to which the invention pertains.

What is claimed is:

1. A method for time synchronisation of at least two clocks contained in a multiprocessor system, wherein a first clock having a predetermined clock rate generates consecutive respective time-stamps indicating the time and at least one second clock, which has an adjustable clock rate, is synchronised with the first clock at certain intervals, comprising:

a) recording, at predetermined time intervals, the relative temporal position of flanks of the first clock and of the second clock representing the transition between two consecutive time-stamps;

b) determining, from the change in the relative temporal position of the transition flanks of the first clock and of the second clock, a correction factor representing the time deviation between the first clock and the second clock;

c) readjusting, using the correction factor representing the time deviation between the first clock and the second clock, the clock rate of the second clock, wherein the readjustment is a diminution of the time deviation between the first clock and the second clock; and d) repeating steps a) to c), wherein the change in the temporal position of the transition flank of the first clock and of the second clock is recorded by a two-stage flank search, by the time-stamp of the clock in question being read out once before an assumed transition flank between two consecutive time-stamps and once after an assumed transition flank between two consecutive time-stamps and by the time-stamp obtained in each instance being compared with the time-stamp expected for the time of read-out and by this process being continued, wherein i) a concordance both of the time-stamp obtained in the case of read-out before the assumed transition flank with the expected time-stamp and of the time-stamp obtained in the case of read-out after the assumed transition flank with the expected time-stamp is appraised with respect to a correct position of the assumed transition flank, ii) a concordance of the time-stamp obtained in the case of read-out before the assumed transition flank with the expected time-stamp and a concordance of the time-stamp obtained in the case of read-out after the assumed transition flank, but with an earlier time-stamp than that expected, is appraised with respect to a belated position of the assumed transition flank, and iii) a concordance of the time-stamp obtained in the case of read-out after the assumed transition flank with the expected time-stamp and a concordance of the time-stamp obtained in the case of read-out before the assumed transition flank, but with a later time-stamp than that expected, is appraised with respect to a premature position of the assumed transition flank.

2. A method according to claim 1, wherein the temporal position of the transition flanks of the first clock and/or of the second clock is recorded by polling, by the time-stamp of the clock in question being read out at least twice in succession and by the time-stamps obtained thereby being compared with one another and by the read-out of the time-stamp being repeated until such time as the time-stamp last obtained differs from the previous time-stamp.

3. A method according to claim 1, wherein the reading of the time-stamps is undertaken in each instance before and after the same assumed transition flank between the same two consecutive time-stamps.

4. A method according to claim 1, wherein the reading of the time-stamps is undertaken in each instance before and after various assumed transition flanks between two different respective consecutive time-stamps.

5. A method according to claim 4, wherein the reading of the time-stamps is undertaken in each instance alternately before and after various assumed transition flanks which follow one another at equal time intervals.

6. A method according to claim 1, wherein the correction factor representing the time deviation between the first clock and the second clock is determined by comparison of the temporal spacing between, in each instance, two transition flanks of the first and second clocks corresponding to one another.

7. A method according to claim 1, wherein the clock rate of the second clock is readjusted by a diminution of the time deviation between the first clock and the second clock when at least two consecutive read-out processes have resulted in a time deviation in the same direction either of a belated position or of a premature position of the assumed transition flanks.

8. A method according claim 1 wherein the first clock is a central, cyclically accurate clock.

9. A method according to claim 1, wherein at least one second clock is an internal clock of a processor contained in the multiprocessor system.

10. A method according to claim 9, wherein the second, internal clock is a virtual clock generated by software.

11. A method according to claim 1, wherein the multiprocessor system includes several processors with several second clocks assigned to these processors, which are synchronised with the first clock.

12. A method according to claim 11, wherein the several second clocks are each synchronised with the first clock at different consecutive times.

* * * * *